United States Patent [19]

Lawther

[11] Patent Number: 6,026,247
[45] Date of Patent: Feb. 15, 2000

[54] SHUTTER AND FLASH SYNCHRONIZATION ASSEMBLAGE

[75] Inventor: Joel S. Lawther, East Rochester, N.Y.

[73] Assignee: Eastman Kodak Company, Rochester, N.Y.

[21] Appl. No.: 09/251,787

[22] Filed: Feb. 17, 1999

[51] Int. Cl.[7] .................................................. G03B 15/02
[52] U.S. Cl. ............................ 396/180; 396/6; 396/493
[58] Field of Search ................................. 396/6, 180, 493

[56] References Cited

U.S. PATENT DOCUMENTS

| | | | |
|---|---|---|---|
| 2,490,775 | 12/1949 | Hutchison, Jr. ........................ | 396/180 |
| 2,602,384 | 7/1952 | Henne ................................... | 396/180 |
| 2,627,214 | 2/1953 | Pirwitz .................................. | 396/180 |
| 2,903,950 | 9/1959 | Fairbank . | |
| 3,307,107 | 2/1967 | Kagan ................................... | 396/180 |
| 3,603,229 | 9/1971 | Noack et al. ......................... | 396/180 |
| 3,605,591 | 9/1971 | Rigolini et al. . | |
| 3,709,127 | 1/1973 | Milanese et al. ..................... | 396/180 |
| 4,067,029 | 1/1978 | Vesper et al. . | |
| 4,903,058 | 2/1990 | Schappler ............................. | 396/180 |
| 5,619,737 | 4/1997 | Horning et al. . | |
| 5,708,876 | 1/1998 | Allen et al. . | |
| 5,913,084 | 6/1999 | Allen et al. .......................... | 396/180 |

*Primary Examiner*—Russell Adams
*Attorney, Agent, or Firm*—Roger A. Fields

[57] ABSTRACT

A shutter and flash synchronization assemblage comprising a flash circuit board having a shutter-flash synchronization contact, a shutter blade supported for movement between a lens covering position and a lens uncovering position, and an electrically conductive return spring urging the shutter blade to be returned to the lens covering position and connected with the flash circuit board to permit flash illumination to be triggered when the shutter blade is moved to the lens uncovering position, is characterized in that the shutter blade is electrically non-conductive, and the return spring has a synchronization portion arranged for the shutter blade to move the synchronization portion against the shutter-flash synchronization contact to trigger flash illumination when the shutter blade is moved to the lens uncovering position.

6 Claims, 2 Drawing Sheets

SHUTTER AND FLASH SYNCHRONIZATION ASSEMBLAGE

FIELD OF THE INVENTION

The invention relates generally to the field of photography, and in particular to a shutter and flash synchronization assemblage to be included in a reloadable or one-time-use camera.

BACKGROUND OF THE INVENTION

One-time-use cameras are known in which a shutter and flash synchronization assemblage comprises a flash circuit board having a shutter-flash synchronization contact, an electrically conductive shutter blade supported for movement between a lens covering position spaced from the synchronization contact and a lens uncovering position located against the synchronization contact to establish a temporary conductive connection between the flash circuit board and the shutter blade, and an electrically conductive return spring urging the shutter blade to be returned to the lens covering position and connected with the flash circuit board to permit flash illumination to be triggered when the shutter blade is moved to the lens uncovering position. See prior art commonly assigned U.S. Pat. No. 4,903,058 issued Feb. 20, 1990 and U.S. Pat. No. 5,708,876 issued Jan. 13, 1998.

SUMMARY OF THE INVENTION

According to one aspect of the invention, a shutter and flash synchronization assemblage comprising a flash circuit board having a shutter-flash synchronization contact, a shutter blade supported for movement between a lens covering position and a lens uncovering position, and an electrically conductive return spring urging the shutter blade to be returned to the lens covering position and connected with the flash circuit board to permit flash illumination to be triggered when the shutter blade is moved to the lens uncovering position, is characterized in that:

the shutter blade is electrically non-conductive; and the return spring has a synchronization portion arranged for the shutter blade to move the synchronization portion against the shutter-flash synchronization contact to trigger flash illumination when the shutter blade is moved to the lens uncovering position.

Preferably, the synchronization portion projects from the shutter blade to be located against the shutter-flash synchronization contact and to hold the shutter blade spaced from the shutter-flash synchronization contact when the shutter blade is in the lens uncovering position.

According to another aspect of the invention, a method of triggering flash illumination using a shutter and flash synchronization assemblage that includes a flash circuit board having a shutter-flash synchronization contact, an electrically non-conductive shutter blade supported for movement between a lens covering position and a lens uncovering position, and an electrically conductive return spring urging the shutter blade to be returned to the lens covering position and connected with the flash circuit board to permit flash illumination to be triggered when the shutter blade is moved to the lens uncovering position, is provided. The method comprises:

moving a synchronization portion of the return spring against the shutter-flash synchronization contact to trigger flash illumination when the shutter blade is moved to the lens uncovering position, and simultaneously holding the shutter blade spaced from the flash synchronization contact.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
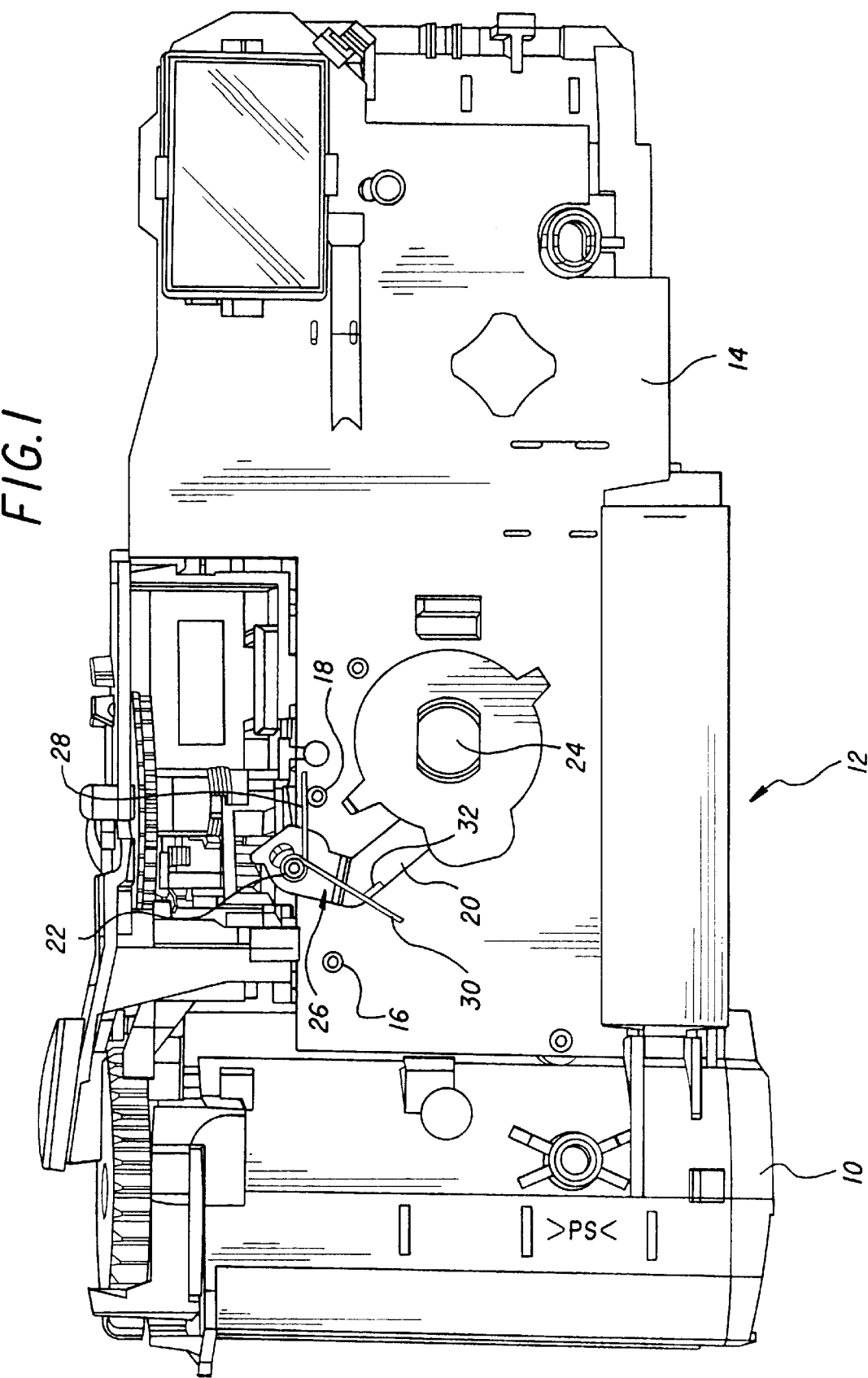
FIG. 1 is a front elevation view partially showing a one-time-use camera with a shutter blade in a lens covering position, consistent with a preferred embodiment of the invention.
Figure 2:
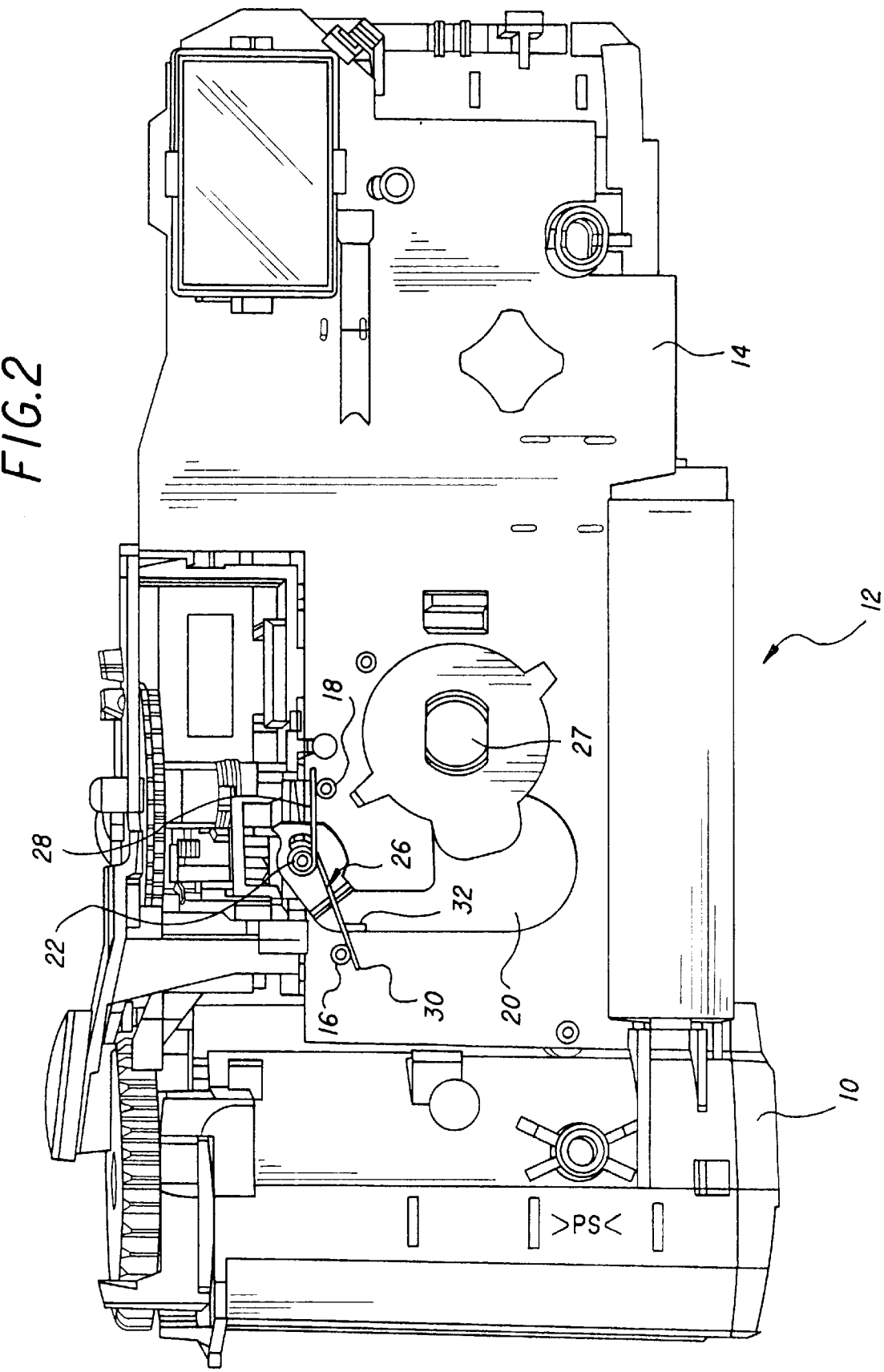
FIG. 2 is a front elevation view similar to FIG. 1 showing the shutter blade in a lens uncovering position.

Referring now to the drawings, FIGS. 1 and 2 show an opaque plastic main body part 10 of a one-time-use camera and a shutter and flash synchronization assemblage 12 in front of the main body part.

The shutter and flash synchronization assemblage 12 comprises a known electronic flash circuit board 14 with a pair of electrically conductive shutter-flash synchronization contacts 16 and 18, an electrically non-conductive shutter blade 20 supported on an integral mounting pin 22 of the main body part 10 for pivotal opening and closing movements between a lens covering position behind a taking lens 24 as shown in FIG. 1 and a lens uncovering position removed from the taking lens as shown in FIG. 2, and an electrically conductive return spring 26 fixed on the mounting pin. The return spring 26 has one spring leg 28 connected to the synchronization contact 18 and another spring leg 30, which is a synchronization portion of the return spring, connected to the shutter blade at a raised edge piece 32 of the shutter blade and projecting from the shutter blade at the raised edge piece.

When a shutter release button 34 is manually depressed to take a picture, a known high energy lever (not shown) is released to pivot the shutter blade 20 from its lens covering position as shown in FIG. 1 to its lens uncovering position as shown in FIG. 2. Since the spring leg 30 of the return spring 26 projects from the shutter blade 20, it is flexed against the shutter-flash synchronization contact 16 to cause the return spring to bridge that synchronization contact and the synchronization contact 18 to thereby trigger flash illumination. Also, the spring leg 30 of the return spring 26 prevents the shutter blade 20 from reaching the synchronization contact 16. See FIG. 2. Once the high energy lever moves past the shutter blade 20, the spring leg 30 of the return spring 26 returns the shutter blade to its lens covering position.

The invention has been described with reference to a preferred embodiment. However, it will be appreciated that variations and modifications can be effected by a person of ordinary skill in the art without departing from the scope of the invention.

PARTS LIST 10. main body part
12. shutter and flash synchronization assemblage 14. flash circuit board
16. shutter-flash synchronization contact
18. shutter-flash synchronization contact
20. shutter blade
22. mounting pin
24. taking lens
26. return spring
28. spring leg
30. spring leg/synchronization portion
32. raised edge piece

What is claimed is:

1. A shutter and flash synchronization assemblage comprising a flash circuit board having a shutter-flash synchronization contact, a shutter blade supported for movement between a lens covering position and a lens uncovering position, and an electrically conductive return spring urging said shutter blade to be returned to the lens covering position and connected with said flash circuit board to permit flash illumination to be triggered when said shutter blade is moved to the lens uncovering position, is characterized in that:

said shutter blade is electrically non-conductive; and said return spring has a synchronization portion arranged for said shutter blade to move said synchronization portion against said shutter-flash synchronization contact to trigger flash illumination when the shutter blade is moved to the lens uncovering position.

2. A shutter and flash synchronization assemblage as recited in claim 1, wherein said synchronization portion projects from said shutter blade to be located against said shutter-flash synchronization contact and to hold the shutter blade spaced from the shutter-flash synchronization contact when the shutter blade is in the lens uncovering position.

3. A shutter and flash synchronization assemblage as recited in claim 1, wherein said synchronization portion is resilient to permit said shutter blade to move the synchronization portion against said shutter-flash synchronization contact and to urge the shutter blade to be returned to the lens covering position.

4. A shutter and flash synchronization assemblage as recited in claim 3, wherein said synchronization portion projects from said shutter blade to be located against said shutter-flash synchronization contact when the shutter blade is in the lens uncovering position and is coupled with the shutter blade to return the shutter blade to the lens covering position.

5. A shutter and flash synchronization assemblage as recited in claim 1, wherein a mount supports said shutter blade to pivot between the lens covering and uncovering positions, and said return spring is fixed on said mount and has one leg connected with said flash circuit board and another leg which constitutes said synchronization portion.

6. A method of triggering flash illumination using a shutter and flash synchronization assemblage that includes a flash circuit board having a shutter-flash synchronization contact, an electrically non-conductive shutter blade supported for movement between a lens covering position and a lens uncovering position, and an electrically conductive return spring urging the shutter blade to be returned to the lens covering position and connected with the flash circuit board to permit flash illumination to be triggered when the shutter blade is moved to the lens uncovering position, said method comprising:

moving a synchronization portion of the return spring against the shutter-flash synchronization contact to trigger flash illumination when the shutter blade is moved to the lens uncovering position, and simultaneously holding the shutter blade spaced from the flash synchronization contact.

* * * * *